US 6,247,769 B1

(12) United States Patent
Spitzer et al.

(10) Patent No.: US 6,247,769 B1
(45) Date of Patent: Jun. 19, 2001

(54) MODULAR BOOK/COMPUTER SHELF MOVING CART

(76) Inventors: Christopher G. Spitzer, 5 Firehorn Dr., Milford, NJ (US) 08848; Richard F. Spitzer, 26 Conkling Rd., Flanders, NJ (US) 07836

( * ) Notice: Subject to any disclaimer, the term of this patent is extended or adjusted under 35 U.S.C. 154(b) by 0 days.

(21) Appl. No.: 09/525,417

(22) Filed: Mar. 15, 2000

(51) Int. Cl.⁷ .................................................. A47B 47/00
(52) U.S. Cl. ..................................... 312/249.8; 312/201
(58) Field of Search .................. 312/249.1, 249.8, 312/223.3, 198, 199, 200, 201, 107, 283, 286, 209, 351; 280/47.18, 47.34, 47.35

(56) References Cited

U.S. PATENT DOCUMENTS

| | | |
|---|---|---|
| 1,779,218 * | 10/1930 | Schmalzgruber ............... 312/199 X |
| 1,858,086 * | 5/1932 | House ................................. 312/201 X |
| 2,555,178 | 6/1951 | Young . |
| 3,905,662 | 9/1975 | Richmond . |
| 4,102,275 | 7/1978 | Spound et al. ..................... 108/92 |
| 4,709,971 | 12/1987 | Leeds et al. ..................... 312/201 |
| 5,683,155 * | 11/1997 | Sarno ................................. 312/201 |
| 5,749,636 | 5/1998 | Boury ................................. 312/201 |

* cited by examiner

Primary Examiner—Peter M. Cuomo
Assistant Examiner—James O. Hansen
(74) Attorney, Agent, or Firm—Kenneth P. Glynn, Esq.

(57) ABSTRACT

A modular shelf moving cart includes a base with a plurality of wheels for permitting movement of said base, a first shelf retaining unit which is removably fastened to the base and which extends vertically from the base, and a second shelf retaining unit removably fastened to the base adjoining the first shelf retaining unit. The second unit is configured so as to permit 180 degree rotation thereof in order to engender a first configuration having dual open sided shelf unit with a central dividing wall and a second configuration having a single open sided shelf unit with a rear wall thereby doubling the side-to-side storage depth capacity of the modular shelf moving cart.

17 Claims, 5 Drawing Sheets

MODULAR BOOK/COMPUTER SHELF MOVING CART

BACKGROUND OF THE INVENTION

1. Field of the Invention

The present invention is directed to modular moving carts and, more particularly, to modular moving carts having two distinct manually fixable configurations whereby a first manually assembleable configuration engenders a dual, open-sided storage cart with a vertically extended central dividing wall and a second configuration which engenders a single open sided storage cart with twice the horizontal side-to-side storage depth and a rear vertically extended back wall.

2. Information Disclosure Statement

Conventional shelving units are typically one piece or multi piece units which are constructed so as to fixedly store shelves at pre-selected intervals but which at the same time do not permit the simple conversion of the unit so as to increase or decrease the horizontal storage depth of the same. The following patents describe the state of the art with relation to shelving units.

U.S. Pat. No. 2,555,178 to P. O. Young describes a collapsible maid service truck of the character described which comprises a body frame having a plurality of fixed shelves; a pair of wheels mounted on the lower rear edge of said frame; a pair of swivel casters mounted on the front of said frame; a folding shelf assembly removably supported on the front of said frame; a folding frame hingedly fastened to the upper rear edge of said frame, and an articulated tail hinged to the lower rear edge of the frame.

U.S. Pat. No. 3,905,662 to J. W. Richmond describes a combined cabinet and table having two hingedly connected halves, each comprising a top wall, a bottom wall, a rear wall, a side wall and a front wall, said cabinet halves opening toward each other when the cabinet is closed. Horizontally disposed shelves are mounted within the cabinet halves for movement toward and away from the side walls thereof when the cabinet is open and said side walls are substantially co-planar. The shelves are removable from the cabinets and the two halves are provided with latches for holding them in the open or closed positions. The two halves are mounted upon wheels and all corners of said cabinet are rounded.

U.S. Pat. No. 4,102,275 to A. M. Spound et al. describes a modular shelf unit capable of assuming a variety of horizontal widths and angular configurations. The aesthetically pleasing shelf unit is formed from two independent upstanding side supports each having a plurality of cantilevered shelves extending therefrom and cooperative with one another to provide an interdigitated, self-supporting shelf unit that is both expandable in the horizontal direction and rotatable about an axis common to each independent side support. The resulting shelf unit is an adjustable, self-supporting structure which is readily adaptable for use in available spaces in homes and offices.

U.S. Pat. No. 4,709,971 to R. Leeds et al. describes a computer work station for use with a computer system which includes two sections, a front section and a rear section, pivotally connected about an exterior pivot axis. The rear section includes shelves for supporting some components of the computer system, such as the CPU, display monitor, keyboard and modem. A keyboard shelf is slidably disposed within the rear section, while other shelves are fixedly mounted therewithin. A common power strip is disposed between two of the shelves of the rear section for providing a single connection of at least some of the components of the computer system to an exterior power source. The front section includes a front panel which extends substantially the entire height of the computer work station, and includes a cork strip for posting memoranda and the like thereon. The front section further includes shelves for supporting other components of the computer system, such as a printer and its associated box of paper. None of the shelves extend the complete depth of the computer work station, so that cords used to connect the various components of the computer system may be conventionally placed therebehind. The computer work station also includes fasteners for supporting such cords between the front and rear sections. The front and rear sections are shaped complimentary with respect to each other, so that, when the computer work station is in a closed position, the two sections together form a substantially enclosed object.

U.S. Pat. No. 5,749,636 to N. Boury describes a storage for retaining CD cassettes or the like which includes at least two opposed towers that are hingedly connected along adjacent upright peripheral segments of the towers. The towers include a plurality of aligned ribbed portions that retain the cassettes when the towers are moved to a first locked position. The storage rack permits ready hand access to the cassettes when moved to a second unlocked position.

Notwithstanding the prior art, the present invention is neither taught nor rendered obvious thereby.

SUMMARY OF THE INVENTION

A modular shelf moving cart includes a base with a plurality of wheels for permitting movement of the base and a first shelf retaining unit which is removably fastened to the base and which extends vertically from the base. The first shelf retaining unit includes a top, a bottom and a pair of opposing vertical side walls juxtaposed with the top and bottom and further includes an open front and an open back and a plurality of retaining members for retaining a plurality of removable shelves which are horizontally disposed at preselected intervals therein. The retaining members may be adjustably established therein in order to permit shelves to be spaced at desired horizontally spaced intervals in order to facilitate the storage of varying sizes of cargo. A second shelf retaining unit is removably affixed to the base adjoining the first shelf retaining unit. The second shelf retaining unit includes a top side wall and a pair of opposing vertical side walls juxtaposed with the top sidewall, an open front and includes an elongated back side wall. The second shelf retaining unit also includes a plurality of retaining members for retaining a plurality of removable horizontally disposed shelves at preselected intervals therein. The second shelf retaining unit is configured so as to permit easy removal and subsequent 180 degree rotation thereof in order to, after secure replacement, engender two distinct configurations: the first being a configuration having a dual open sided modular shelf moving cart unit with a central vertical dividing wall; the second being a configuration having a single open-sided modular shelf moving cart unit with a rear vertical wall thereby doubling the side-to-side storage depth capacity of the modular shelf moving cart and further enabling the "safe" storage of varied sizes of cargo within the same unit.

By virtue of the removable, i.e. rotatable, second shelf retaining unit, the present invention cart generates an improved storage profile over the existing art by enabling the simple conversion from a dual open sided format to a single open sided format whereby a user may insert replacement shelves providing twice the side-to-side storage depth or, in the alternative, insert replacement shelves providing half the side-to-side storage depth, thus permitting the safe and secure storage of cargo that would be impossible to stow with existing art.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
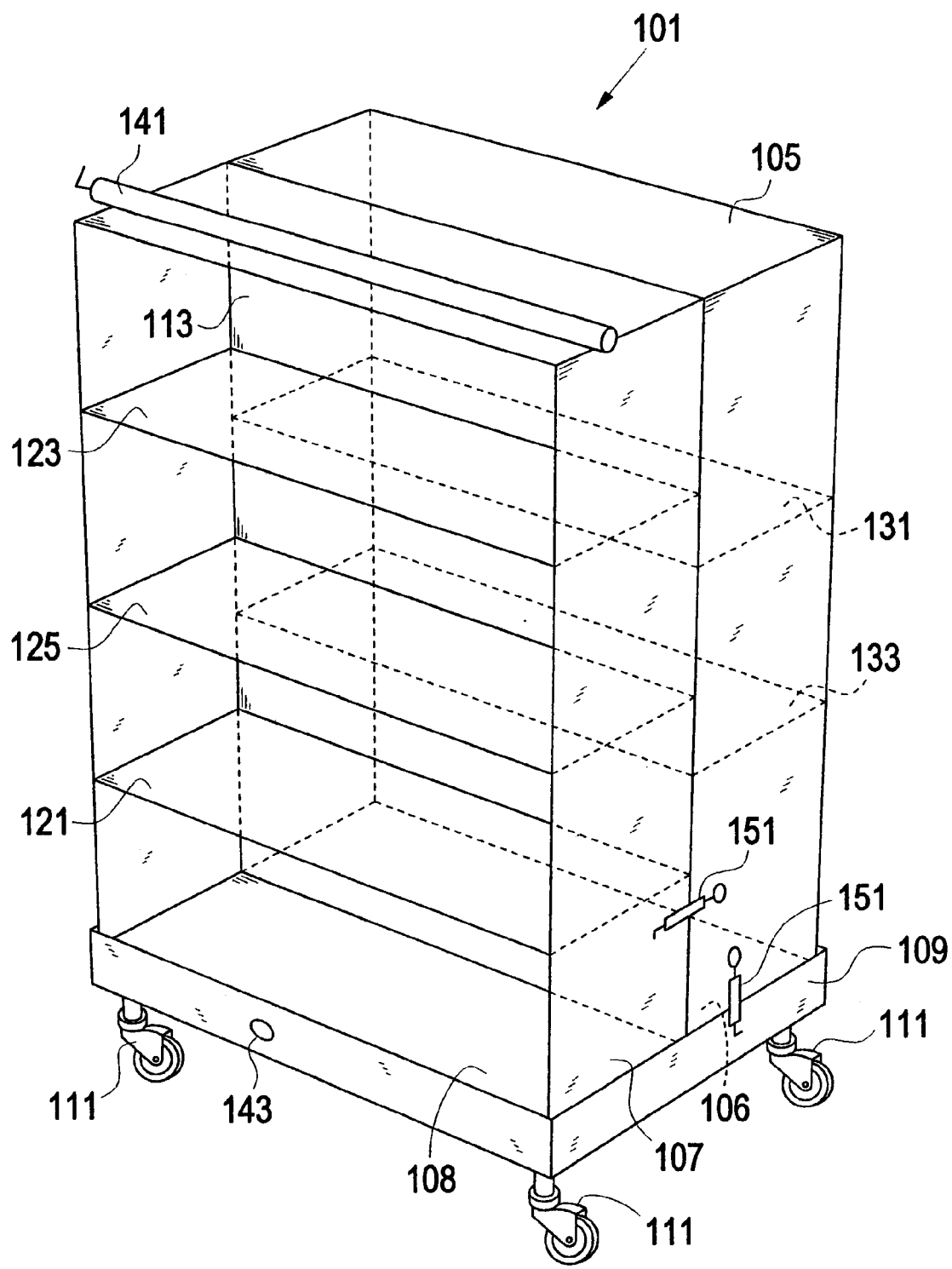
FIG. 1 shows a perspective view of a present invention modular shelf moving cart assembled in a two opposed open sided configuration.

The present invention has the primary object of enabling a simple manually effected conversion of a dual open-sided modular shelf moving storage cart with a central vertical dividing wall to a single open-sided modular shelf moving storage cart with twice the overall continual side-to-side storage depth by virtue of the removal, 180 degree rotation, and replacement of a second shelf storage unit upon the cart. Generally speaking, the present invention modular unit is divided into three parts, namely, a rectangular base member, a first removably attached modular shelf storage unit and a second removably attached modular shelf storage unit. The base may include a plurality of wheels for permitting movement of the cart and the first shelf retaining unit is preferably maintained in a fastened position atop the base and extends vertically therefrom. The base may include a raised outer lip as well as a pocket-type extended cut-out section defined therein for permitting the storage of shelves for later insertion and removal from the modular storage units.

In the preferred embodiment, the first shelf storage unit includes a horizontal top, a horizontal bottom and a pair of opposing vertical side walls juxtaposed with the top and bottom and further includes an open front and an open back and has a plurality of shelf retaining members located therein for retaining a plurality of removable shelves which are, preferably, horizontally disposed at preselected intervals therein. The shelf retaining members may be adjustably established therein in order to permit shelving to be spaced at arbitrary horizontal intervals in order to facilitate the storage of varying sizes of cargo.

A second shelf storage unit is removably affixed to the base adjoining and being removably affixed to the first shelf storage unit by conventional fastening members which permit simple removal and replacement of the second storage unit. The second shelf retaining unit, preferably, includes a horizontal top and bottom and a pair of opposing vertical side walls juxtaposed with the top sidewall and an open front and has a vertically extended back side wall and further includes a plurality of shelf retaining members for retaining a plurality of removable horizontally disposed shelves at preselected intervals therein. The second shelf retaining unit is configured so as to permit easy removal and subsequent 180 degree rotation thereof in order to, after secure replacement, engender two configurations; the first configuration having dual open-sided shelf units with a central vertical dividing wall and a second configuration having a single open-sided shelf storage unit with a single rear wall thereby deepening, or more precisely, doubling the overall continual side-to-side storage depth capacity of the modular shelf moving cart. In other words, cargo having a greater depth may be easily stored in the second configuration of the present invention as well as smaller cargo in the first configuration.

By virtue of the rotatable second shelf storage unit, the present invention cart generates an improved storage profile over the existing art by enabling the simple conversion from a dual open sided cart to a single open sided cart whereby replacement shelves having varied storage depths may be easily substituted for one another within the unit, thus permitting use of the modular moving cart for storing various sizes of cargo.

The present invention may comprise any size and shape and may be constructed out of any conventionally suitable material of manufacture without exceeding the scope of the present invention. Furthermore, the number and location of shelves may vary greatly without exceeding the scope of the present invention. A more precise understanding of the present invention will be achieved by reference to the Figures herein.

Figure 2:
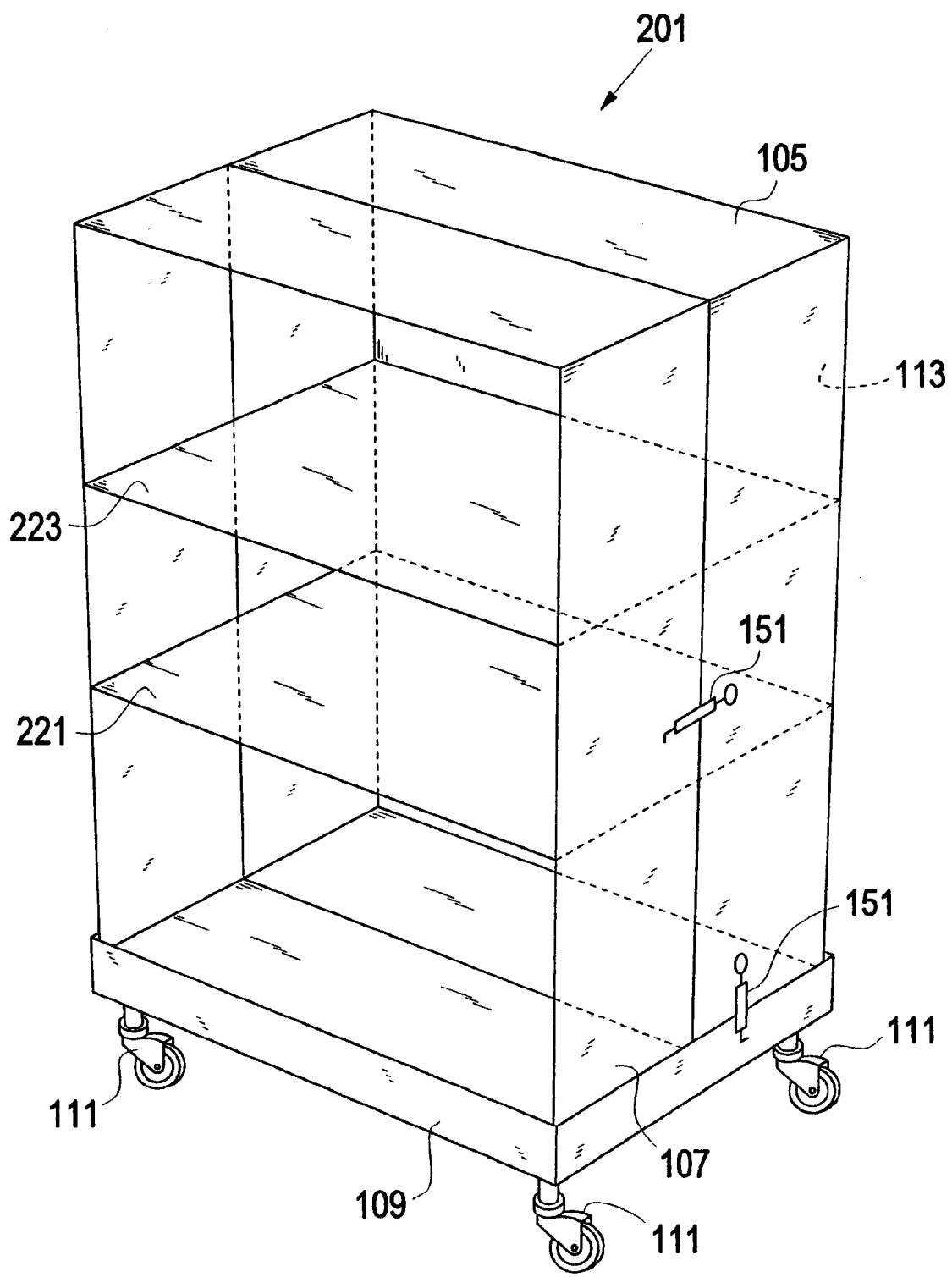
FIG. 2 shows a perspective view of the present invention modular shelf moving cart shown in FIG. 1, assembled in a single open sided configuration.

With general reference to FIGS. 1 and 2 a present invention modular shelf moving cart is shown, wherein FIG. 1 shows a perspective view of a present invention modular shelf moving cart assembled in a dual open sided configuration with a central vertical dividing side wall member and FIG. 2 shows a perspective view of the same present invention modular shelf moving cart assembled in a single open sided configuration whereby the central wall has been relocated to the rear of the unit by virtue of the rotation and replacement of the second shelf storage unit thereby engendering a single rear vertical outer side wall and yielding twice the continual side-to-side storage depth capacity.

Referring now to FIG. 1 modular moving cart 101 is shown in a dual open sided configuration. Modular moving cart 101 includes rectangular base 109 which includes a plurality of wheels 111 which are shown here for illustrative purposes as multi-directional swiveling caster-type wheels. However, any suitable wheel configuration may be utilized without exceeding the scope of the present invention, including but not being limited to, ball and socket, adjustable or fixed rotational or otherwise. Shelf storage unit 107 is removably attached to base 109 and, as shown here, is open-sided in both the front as well as the rear. Shelf storage unit 107 includes shelf members 121, 123 and 125. Particular note should be made of shelf 125 which is established to include a sloped horizontal position such that the angular disposition of shelf 125 is biased downwardly toward the center of the unit to prevent cargo spillage. Thus, it is to be understood that the shelving may be located in any variety of vertical positions as well as encompass any variety of angular dispositions.

Shelf unit 105, as shown here, is open-sided on one side and includes vertical side wall 113 which extends vertically from the top of shelf unit 105 down toward base 109. In this configuration vertical side wall 113 serves as a central dividing wall member which bifurcates the entire modular moving cart 101 through a central vertical position so as to serve as a surrogate rear wall for shelf unit 107. As shown in FIG. 1, shelf unit 105 includes shelf units 131 and 133. To provide added stability, shelf unit 105 is, preferably, removably attached not only to base 109 but also removably attached to shelf unit 107 by fastening members 151 which are shown here as simple clamp type fastening members. However, any conventional fastening member may be employed such as clip members, rod members, lock members or otherwise.

Referring now to FIG. 2, modular moving cart 201 is shown wherein shelf unit 105 has been removed, rotated 180 degrees and replaced upon base 109 so as to double the side-to-side horizontal depth of modular moving cart 201 to thereafter permit the insertion of horizontally extended replacement shelf units 221 and 223. In this configuration, vertical side wall 113 is now positioned on the outer edge of base 109 as shown. Thus, in this instance, the combined overall horizontal storage depth has been doubled by the unique removal and replacement of shelf storage unit 105. However, it should be understood that shelf storage unit 105 may include a vertical side wall which is not located on its outer fringe but may instead be located in any number of vertical positions, thereby effecting any variety of side-to-side depths. Likewise, shelf storage unit 105 may embody a dimension which extends less than halfway across base 109 and shelf storage unit accordingly embody a dimension which extends more than halfway across base 109. In other words, the vertical side wall of shelf storage unit 105 is not required to serve as a central divider, but may be positioned in any variety of vertical locations without exceeding the scope of the present invention.

Referring back to FIG. 1, coiled cover 141 is fixed upon the top of modular moving cart 107 so as to prevent cargo from slipping out of shelf unit 107 when unrolled and connected to cover locking member 143. While cover member 141 is shown here as a coiled casing member which can unroll and lock in cargo, any suitable cover member may be employed such as buckled shroud or an insertable rigid cover which is locked in place at various connecting points by a plurality of snaps or pins.

Figure 3:
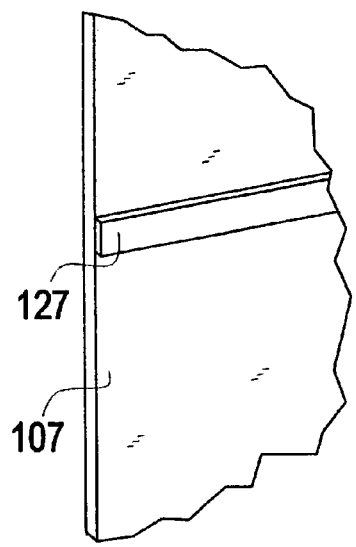
FIG. 3 is a sectional view illustrating details of a shelf retaining member.
Figure 4:
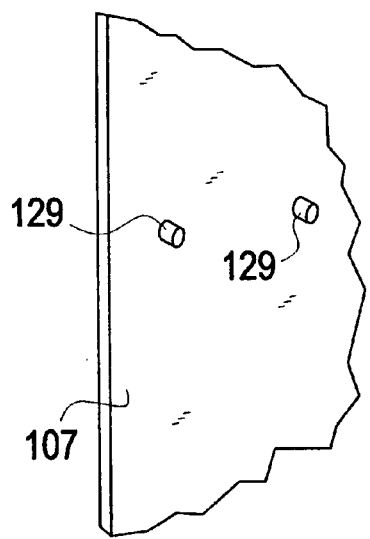
FIG. 4 is a sectional view illustrating details of another shelf retaining member.

Referring now to FIGS. 3 and 4, FIG. 3 shows a sectional view illustrating details of a shelf retaining member and FIG. 4 shows a sectional view illustrating details of another alternative embodiment shelf retaining member. Referring specifically to FIG. 3, a detailed partial view of shelf unit 107 is shown. Shelf retaining member 127 is shown here as a recessed track which permits the insertion and sliding of a shelf therealong to fixedly maintain the shelf therein. Shelf retaining member 127 may comprise any slope as well as any diameter without exceeding the scope of the present invention.

Referring now to FIG. 4, by manner of illustration, shelf unit 107 includes a pair of annular protrusions 129 upon which a shelf may be rested. While only a pair of protrusions are shown here, any number of protrusions may be employed. Furthermore, any other conventional retaining member may be employed, such as rollers, a rack and pinion system, a set of bearings or otherwise.

Figure 5:
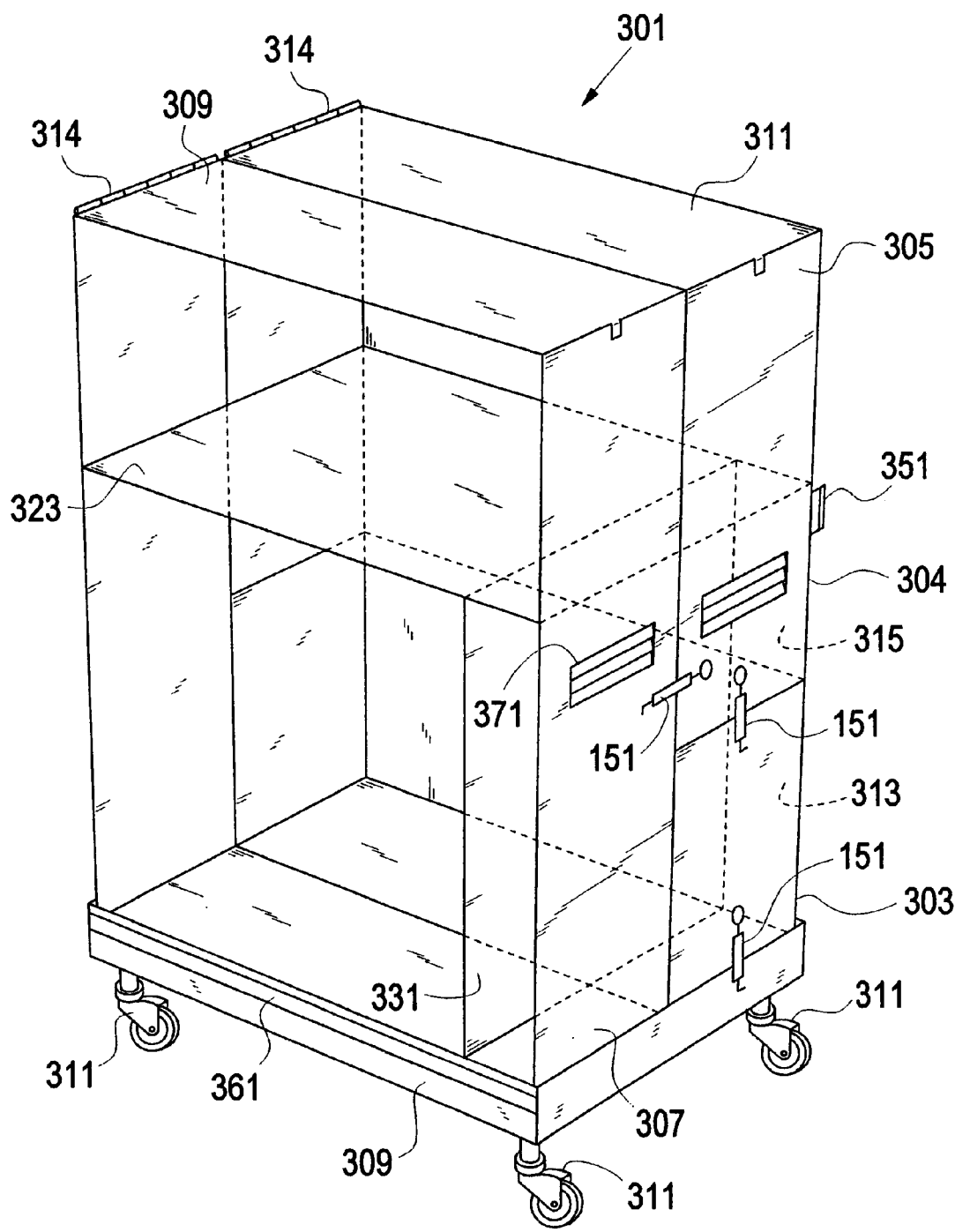
FIG. 5 shows a perspective view of an alternative embodiment present invention modular shelf moving cart, assembled in a single open sided configuration.

Referring now to FIG. 5, alternative embodiment modular moving cart 301 is shown in a single open-sided configuration wherein modular moving cart 301 includes base 309 which includes wheel members 311. In this case, base 309 has an extended pocket-type shelf storage section 361 which is configured to store shelves which are not in use. Shelf unit 305 is established upon base 309 so as to increase the side-to-side depth of modular moving cart 301 and to permit the insertion of horizontally extended shelf 323. Vertical dividing wall 331 has been inserted to sub-divide the storage area below shelf 323. Thus, vertical dividing walls may be employed in any number and form. Here, shelf storage unit 305 is defined by two halves, an upper half 304 and a lower half 303 and each are removably attached to base 309 and shelf storage unit 307 by fastening members 151 as shown. In this instance, a user my rotate one or both halves of shelf storage unit 307 in order to engender a multi-faceted multi-depth storage area in order to transport varied sizes of cargo simultaneously. Thus, vertical sidewalls 313 and 315 may extend adjoining one another to effect a single rear wall or may, after rotation of one of upper half 304 or lower half 303, be positioned parallel to one another in separate locations. In addition, hinged tops 309 and 311 are hingedly connected to shelf storage units 307 and 305 by hinge points 314 as shown in order to augment the ease with which to store and remove cargo. Modular cart linking member 351 may also be employed in order to join together a plurality of modular moving carts 301, thereby enabling the simultaneous transport of numerous amounts of cargo. Handles 371 may also be employed to add ease of use while moving cargo. It is to be understood that the second removable shelf storage unit may be divided not only into two sections but also into thirds, or quarters or otherwise without exceeding the scope of the present invention. In such a case, a user could arrange the present invention modular moving cart in a variety of complex storage arrangements. Also, in the case of employing a second shelf storage unit divided in half, it should be understood to be within the scope of the present invention to provide each half with a top and bottom to increase the overall stability and integrity of the pieces.

Figure 6:
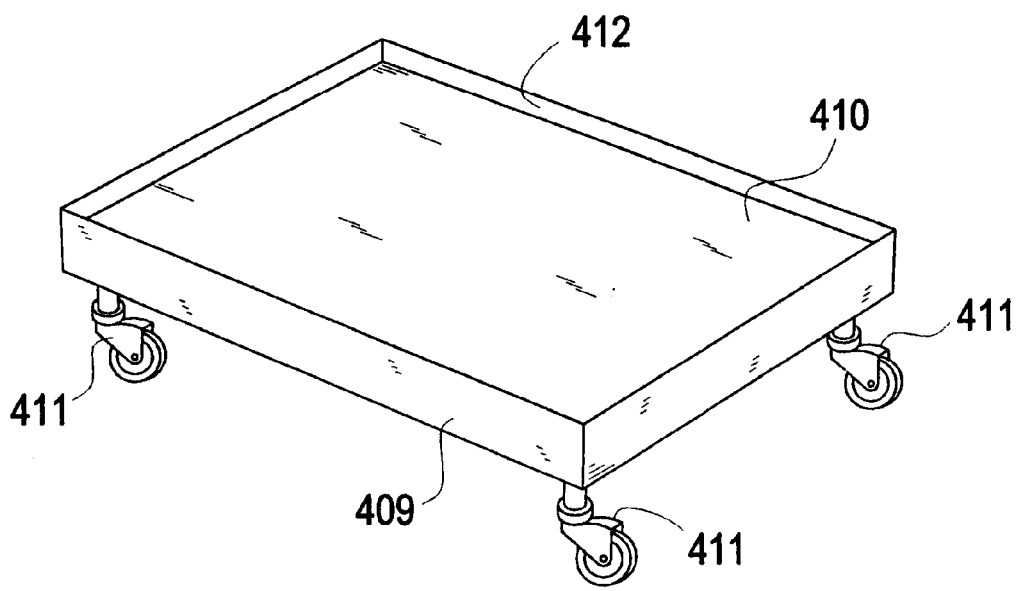
FIG. 6 shows a perspective view of a preferred base, illustrating details of a raised outer lip.

Referring to FIG. 6, a preferred base 409 is shown having a flat upper surface 410 and a raised lip 412 which extends around the outer edge of base 409. Caster type wheels 411 are employed as shown, however, any conventional wheel configuration may be employed.

Obviously, numerous modifications and variations of the present invention are possible in light of the above teachings. It is therefore understood that within the scope of the appended claims, the invention may be practiced otherwise than as specifically described herein.

What is claimed is:

1. A modular shelf moving cart comprising:

a rectangular base member having four outer edges, said base member having a plurality of wheels connected thereto for enabling movement of said base;

a first shelf storage unit, said first shelf storage unit being removably attached to said base and extending vertically from said base, said first shelf storage unit having a top, a bottom and two opposing vertical side walls juxtaposed perpendicularly with said top and said bottom, said first shelf storage unit having an open front and an open back, said first shelf storage unit further comprising at least one set of shelf retaining members located therein for retaining at least one removable shelf in a preselected position therewithin;

a second shelf storage unit having a first and a second placement position, said second shelf storage unit having fastening means for removably attaching said second shelf storage unit to said base, said fastening means enabling removal and secure replacement of said second shelf storage unit upon said base, said second shelf storage unit extending vertically from said base and being located adjacent to said first shelf storage unit, said second shelf storage unit having a top, a bottom and two opposing vertical side walls perpendicularly juxtaposed with said top and bottom, said second shelf storage unit having an open front and a vertically extended back sidewall, said second shelf storage unit further comprising at least one set of shelf retaining members located therein for retaining at least one removable shelf disposed at a preselected position therewithin, wherein when said second shelf storage unit is in said first placement position, said vertically extended back side wall is inwardly displaced upon said base adjoining said first shelf storage unit thereby establishing an interior dividing wall and establishing a dual open sided modular moving cart, and wherein when said second shelf storage unit is in said second placement position, said vertically extended back side wall is located proximate to one of said outer edges of said base thereby establishing a rear wall and further establishing a single open sided modular moving cart.

2. The modular shelf moving cart according to claim 1 wherein when said second shelf storage unit is in said first placement position, said vertically extended back side wall is centrally displaced upon said base adjoining said first shelf storage unit thereby establishing a central dividing wall and establishing a dual open sided modular moving cart, and wherein when said second shelf storage unit is in said second placement position, said vertically extended back side wall is located proximate to one of said outer edges of said base thereby establishing a rear wall and further establishing a single open sided modular moving cart.

3. The modular shelf moving cart according to claim 1 wherein when said second shelf storage unit is in said first placement position said first and second shelf storage units each comprise at least one separate shelf therein.

4. The modular shelf moving cart according to claim 3 wherein said shelves are horizontally displaced.

5. The modular shelf moving cart according to claim 1 wherein when said second shelf storage unit is in said second placement position said first and second shelf storage units each comprise at least one extended shelf therein, said shelf extending fully from said open front of said first shelf storage unit to said vertically extended back sidewall of said second shelf storage unit.

6. The modular shelf moving cart according to claim 1 wherein said modular moving cart includes at least one removable vertical dividing wall.

7. The modular shelf moving cart according to claim 1 wherein said modular moving cart includes cover means for securing cargo within said modular shelf moving cart and wherein at least one of said first and second shelf storage units includes at least one handle.

8. The modular shelf moving cart according to claim 1 wherein at least one of said first and said second shelf storage units includes a hinged top.

9. The modular shelf moving cart according to claim 1 wherein said base includes means defined therein for storing shelving.

10. The modular shelf moving cart according to claim 1 wherein said second shelf storage unit is divided into an upper and a lower section whereby said vertically extended back sidewall is defined by an upper and lower segment, wherein when both of said upper and lower sections of said second shelf storage unit are in said first placement position, said vertically extended back side wall upper and lower segments are inwardly displaced upon said base adjoining said first shelf storage unit thereby establishing an interior dividing wall and establishing a dual open sided modular moving cart, and wherein when both of said upper and lower sections of said second shelf storage unit are in said second placement position, said vertically extended back side wall upper and lower segments are located proximate to one of said outer edges of said base thereby establishing a rear wall and further establishing a single open sided modular moving cart, and wherein when one of said upper and lower sections of said second shelf storage unit is in said first placement position and the other of said upper and lower sections of said second shelf storage unit is in said second placement position, said vertically extended back side wall is divided, and wherein one of said upper and lower segments is located in said first inwardly displaced position upon said base adjoining said first shelf storage unit thereby establishing an interior partial vertically extended dividing wall and wherein the other of said upper and lower segment is located in said second outwardly displaced position upon said base establishing a separate partial vertically extended rear wall.

11. The modular shelf moving cart according to claim 1 wherein said modular moving cart includes linking means for linking said modular shelf moving cart with another of said modular shelf moving carts.

12. The modular shelf moving cart according to claim 1 wherein when said second shelf storage unit is in said first placement position said first and second shelf storage units each comprise at least two separate shelves therein.

13. The modular shelf moving cart according to claim 12 wherein each of said shelves is horizontally established with an angular slope.

14. The modular shelf moving cart according to claim 12 wherein at least one of said shelves extends horizontally and at least one other said shelf is sloped and extends non-parallel to said horizontally extended shelf.

15. The modular shelf moving cart according to claim 1 wherein said modular shelf moving cart comprises a rectangular cubical shape.

16. The modular shelf moving cart according to claim 1 wherein said modular shelf moving cart includes no shelving.

17. The modular shelf moving cart according to claim 1 wherein said base includes a raised lip which extends upwardly from said outer edges and includes a flat upper surface area defined inside said raised lip.

\* \* \* \* \*